UNITED STATES PATENT OFFICE.

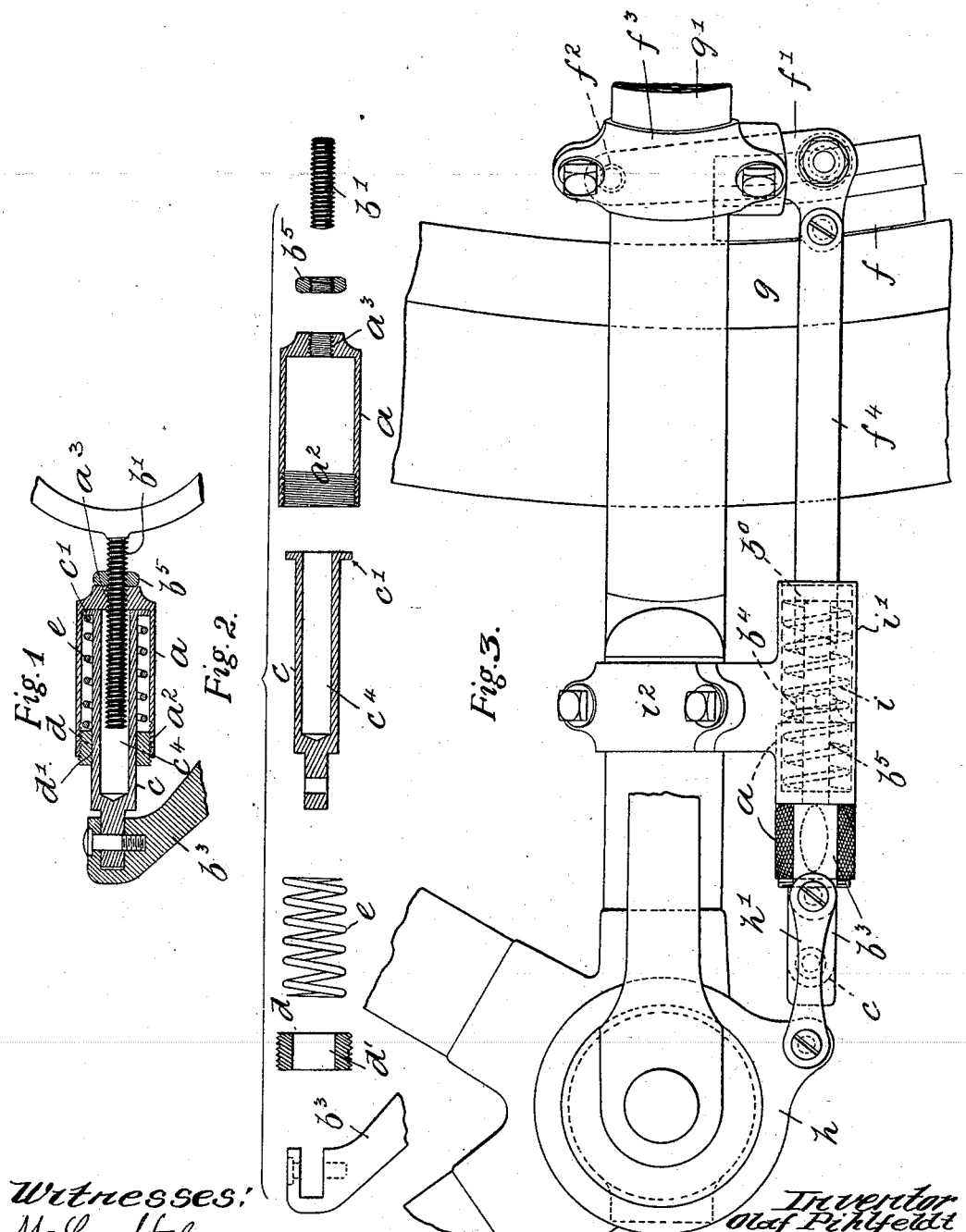

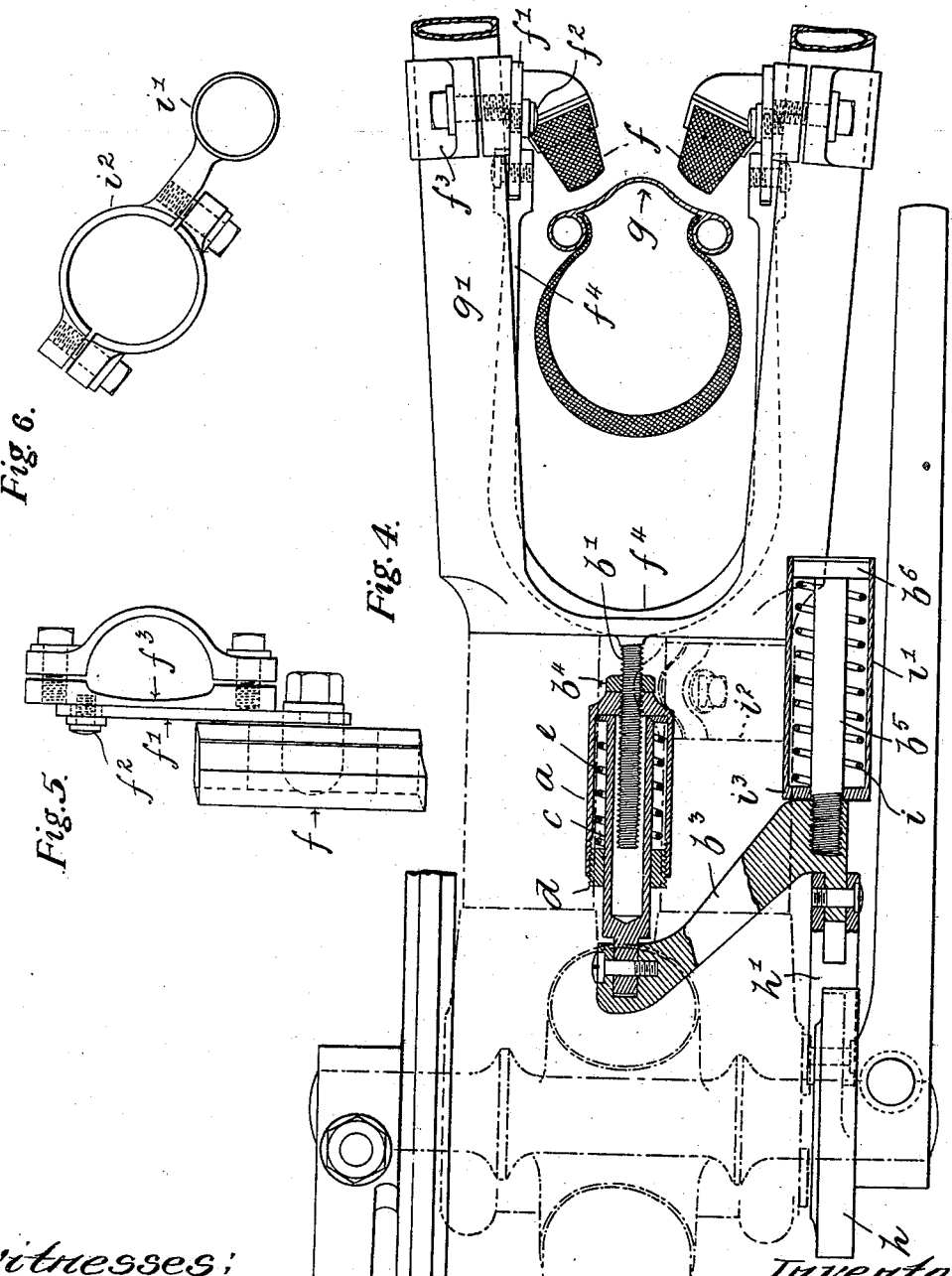

OLAF PIHLFELDT, OF BIRMINGHAM, ENGLAND.

BACK-PEDALING BRAKE.

SPECIFICATION forming part of Letters Patent No. 648,291, dated April 24, 1900.

Application filed July 7, 1899. Serial No. 723,118. (No model.)

*To all whom it may concern:*

Be it known that I, OLAF PIHLFELDT, engineer, a subject of the King of Sweden and Norway, residing at 172 Golden Hillock road, Small Heath, in the city of Birmingham, England, have invented certain new and useful Improvements in Cycle Brake Mechanism, of which the following is a specification.

This invention relates to back-pedaling brake mechanism for cycles having "free" rear or driving wheels, and has for its object to provide such mechanism with improved means whereby the application of the brake is made to be progressive instead of the full retarding power being put on suddenly.

It is well known that sudden checks in the rotation of the wheel of a cycle created by the immediate application of the full retarding power of a brake are fraught with danger to the rider, are liable to damage the tires by causing them to slide along the ground without rotating, and, further, both the brake and the clutches of the driving-gear are apt to be jammed and the wheel locked or scotched. These defects I propose to overcome by the employment of an improved spring-organized brake-pressure moderator so constituted as to form an intervening elastic coupling or yielding connection between the members of a two-part power-transmitter, so that when power created by the back-pedaling action of the rider is conveyed to the one member of the said device it is before being transmitted to the other element and thence to the brake so modified in its initial effect by the said device that the brake is applied progressively or by degrees and the retardation of the wheel is accomplished without a sudden check.

Figure 1 of the accompanying drawings represents a longitudinal section of one form of brake-power moderator constructed according to my invention. Fig. 2 represents the component parts of the same separately. This said moderator device consists of a barrel or cylinder $a$, which is secured to the end $b'$ of the one member $b$ of a two-part power-transmitter and a collar-ended draw-bar $c$, adapted to be connected to the inner end $b^2$ of the arm $b^3$, constituting the other transmitting or operating member, which bar is arranged to slide within the said barrel, whose open end $a^2$ is threaded interiorly to receive an externally-threaded closure or nut $d$, having a guide-hole $d'$ for the said bar through its middle, and between the opposed abutments formed by the collar $c'$ and the inner side of the said nut a coiled spring $e$, surrounding the said draw-bar $c$, is disposed. In order to provide for the adjustment of the brake-operating rods to a machine and also incidentally to alter the tension of the moderator-spring, the screwed end $b'$ of the rod member $b$ may take through a threaded hole in the end $a^3$ of the casing, which is rotatable upon the said rod, and the collared end of the draw-bar may be bored axially at $c^4$ to form a clearance for the inner end of the said rod $b$, to which the moderator-casing is locked in its adjusted position by means of a small lock-nut $b^5$. On movement being transmitted by the actuation of a brake-operating device to the member or arm $b^3$ the bar $c$ is drawn outwardly and its collar is caused to approach the nut or closure $d$, thus gradually compressing the moderator-spring, which modifies the power transmitted by it to the casing $a$ and thence through the rod member $b$ to the brake, which is progressively applied. This device is particularly applicable to rim, disk, and band brakes and to all brakes designed for application to an unyielding surface as distinct from the yielding contact obtained by brakes acting upon a pneumatic or other elastic tire.

Fig. 3 represents an elevation of a clutch-operated back-pedaling back-wheel-rim brake for cycles provided with such a moderator device and showing one method of applying my invention to brakes of this class. Fig. 4 represents the said brake and its accessory parts in plan, but with the moderator and the take-off spring provided for relieving the brake-pressure on the rider ceasing to back-pedal. (Shown in section.) Fig. 5 is a detail view of one of the clips to which an arm carrying a brake-shoe is fulcrumed. Fig. 6 is a detail view of the clip provided for the attachment of the casing of the take-off spring. The brake consists of a pair of shoes or contacts $f$, adapted to impinge against the inner periphery of a wheel-rim $g$ and respectively carried by the lower ends of a pair of arms $f'$, pivoted at $f^2$ to clips $f^3$, embracing the chain-stays $g'$ of the machine. These arms are coupled together and operated in common by a yoke or forked frame $f^4$, provided with a threaded rod or stem $b'$, which is adjustably connected by a lock-nut $b^4$ to the rotatable casing $a$ of a brake-pressure moderator arranged in a convenient position underneath the inner ends of the chain-stays and being of substantially the same construction as previously described, and represented separately in Figs. 1 and 2 with the collar-ended draw-bar $c$ sliding within the casing $a$ and being surrounded by the moderator-spring $e$, disposed between its collar and the nut $d$. The ring $h$ of the pedal-operated clutch is connected by means of a jointed link $h'$ to a power-transmission arm $b^3$, the latter being in turn connected to the draw-bar $c$ of the interposed moderator, while extending from the said arm $b^3$ is a rod $b^5$, having a collar or enlarged termination $b^6$ working within a cylindrical casing $i'$, secured to a convenient frame-tube by means of clip $i^2$ and being encircled by a "take-off" spring $i$, which is confined between the said collar $b^6$ and the closed or shouldered end $i^3$ of the casing $i'$ and is compressed and thereby rendered active when the rod $b^5$ is drawn outward on the brake being applied by the back-pedaling action, while on the pedals being restored to an intermediate and inoperative position the take-off spring by distending relieves the brake-pressure and restores the several parts to their normal positions. In addition to this function of relieving the brake the said spring $i$ when its coils are closed acts as a yielding stop for preventing the excessive application of the brake.

To adjust or set the parts so that the take-off spring shall only come into operation as a stop when the maximum brake-pressure required is being applied to the wheel-rim, the coils of the take-off spring are first fully closed and then by rotating the moderator-casing, which acts as a screw-box, the rod $b'$ is drawn inward until the brake-shoes (with which it is connected by the forked frame $f^4$) are fully home against the rim.

Having fully described my invention, what I desire to claim and secure by Letters Patent is—

1. In a back-pedaling bicycle-brake, a brake, a brake-rod, and a yielding connection connecting said brake and brake-rod, whereby the power applied to the brake-rod is gradually and progressively communicated to the brake, of a fixed cylinder, a plunger rigidly connected to the brake-rod and arranged to reciprocate in the cylinder, and a coiled take-off spring disposed in the cylinder between the closed end of the latter and the plunger-head for restoring the parts to their normal positions and operating as a stop to limit the movement of the brake mechanism, substantially as described.

2. The combination with the brake-rod and brake-shoes, of a cylindrical casing, a yoke connected to the brake-shoes and provided with a threaded stem screwed into a threaded aperture in one end of said casing, a hollow draw-bar disposed in the casing and provided with a collar at its inner end and connected at its outer end to the brake-rod, a coiled spring arranged in the casing between said collar and the opposite end of the casing, said casing being rotatable on the draw-bar and threaded stem to adjust the throw of the brake mechanism, and the hollow draw-bar operating to receive the threaded stem when the latter is screwed into the casing, substantially as described.

3. The combination with the brake-rod and brake-shoes, of a cylindrical casing having a threaded aperature at one end and a centrally-apertured plug removably fixed in its other end, a draw-bar disposed in the casing and provided at its inner end with a collar and projecting loosely at its other end through said plug and connected to the brake-rod, a coiled spring disposed between said collar and plug, and a lock-nut arranged on the threaded stem outside the casing, substantially as described.

In testimony whereof I have hereunto set my hand in presence of two subscribing witnesses.

OLAF PIHLFELDT.

Witnesses:
HENRY SKERRETT,
ARTHUR T. SADLER.